United States Patent
Kempe

(10) Patent No.: US 7,709,809 B2
(45) Date of Patent: May 4, 2010

(54) MICROSCOPE WITH HIGHER RESOLUTION AND METHOD FOR INCREASING SAME

(75) Inventor: Michael Kempe, Jena (DE)

(73) Assignee: Carl Zeiss Microimaging GmbH, Jena (DE)

( * ) Notice: Subject to any disclaimer, the term of this patent is extended or adjusted under 35 U.S.C. 154(b) by 0 days.

(21) Appl. No.: 11/806,459

(22) Filed: May 31, 2007

(65) Prior Publication Data

US 2008/0007730 A1    Jan. 10, 2008

(30) Foreign Application Priority Data

May 31, 2006    (DE) .................. 10 2006 026 204

(51) Int. Cl.
    *F21V 9/16* (2006.01)
(52) U.S. Cl. .................................................. 250/458.1
(58) Field of Classification Search .............. 250/458.1, 250/461.1, 461.2
    See application file for complete search history.

(56) References Cited

U.S. PATENT DOCUMENTS

| | | | |
|---|---|---|---|
| 5,731,588 | A | 3/1998 | Hell et al. |
| 5,866,911 | A | 2/1999 | Baer |
| 6,555,802 | B2 * | 4/2003 | Osipchuk et al. ......... 250/201.3 |
| 7,064,824 | B2 | 6/2006 | Hell |

| | | | |
|---|---|---|---|
| 2002/0036824 | A1 * | 3/2002 | Sasaki ........................ 359/385 |
| 2002/0141052 | A1 | 10/2002 | Iketaki |
| 2004/0207854 | A1 * | 10/2004 | Hell et al. ................... 356/450 |

OTHER PUBLICATIONS

Tadday et al. "New laser system for measurements of dissociation rates of small molecules with picosecond temporal resolution," 1998, Proceedings of SPIE, vol. 3271, pp. 210-219.*
Larsen et al., "Photoisomerization and photoionization of the photoactive yellow protein chromophore in solution,", 2004, Biophysical Journal, vol. 86, pp. 2538-2550.*
Marsh et al., "Stimulated emission depletion following two photon excitation," 2002, Proceedings of SPIE, vol. 4812. pp. 45-54.*
Török et al.; "The Use of Gauss-Laguerre Vector Beams in STED Microscopy"; *Optics Express*; Jul. 2004; pp. 3605-3617; vol. 12, No. 15; Optical Society of America; USA.
Habuchi et al.; "Reversible Single-Molecule Photoswitching in the GFP-like Fluorescent Protein Dronpa"; *Proceedings of the National Academy of Sciences*; Jul. 2005; pp. 9511-9516; vol. 102, No. 27; National Academy of Sciences; USA.

(Continued)

*Primary Examiner*—David P Porta
*Assistant Examiner*—Kiho Kim
(74) *Attorney, Agent, or Firm*—Jacobson Holman PLLC

(57) ABSTRACT

Microscope with higher resolution with partial spatial superposition in the illumination by an excitation beam and a de-excitation beam and/or a switching beam in a fluorescing sample, whereby the light from the sample is deflected, whereby, in the excitation beam and/or in the de-excitation and/or the switching beam, at least one combination of devices exercising circular and radial influence on the spatial phase is provided.

8 Claims, 5 Drawing Sheets

OTHER PUBLICATIONS

Hell et al.; "Ground-state-depletion Fluorescence Microscopy: A Concepts for Breaking the Diffraction Resolution"; *Applied Physics B: Lasers and Optics*; May 1995; pp. 495-497; vol. 60, No. 5; Springer Berlin; Heidelberg, Finland.

Engel et al.; "Creating ?/3 Focal Holes with a Mach-Zehnder Interferometer"; *Applied Physics B: Lasers and Optics*; Aug. 2003; pp. 11-17; vol. 77, No. 1; Springer Berlin; Heidelberg, Finland.

Klar T A et al: "Breaking Abbe's diffraction resolution limit in fluorescence microscopy with stimulated emission depletion beams of various shapes" Physical Review E. Statistical Physics, Plasmas, Fluids, and Related Interdisciplinary Topics, American Institute of Physics, NewYork, NY, US, vol. 64, No. 6, Nov. 26, 2001, p. 66613-1.

N. Bokor et al.: "Investigation of polarization effects for high-numerical-aperture first-order Laguerrw-Gaussian beams by 2D scanning with a single fluorescent microbead" Opti CS Express, vol. 3, No. 26, Dec. 26, 2005, pp. 10440-10447.

O.Haeberle, B. Simon: "Improving the lateral resolution in confocal fluorescence microscopy using laterally interfering excitation beams" Optics Communications, vol. 259, Mar. 15, 2006, pp. 400-408.

\* cited by examiner

Fig. 3
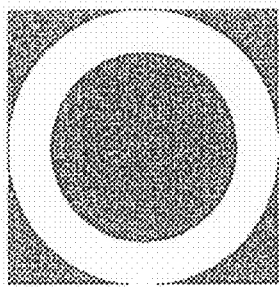
RADIAL MASK R
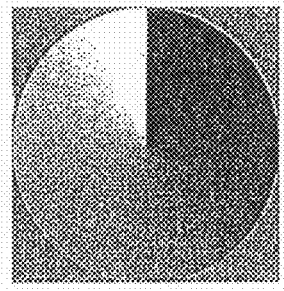
SPIRAL MASK S
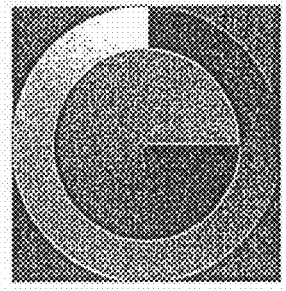
COMBINATION MASK SR
Fig. 4 - REALIZATION 1: DE-EXCITATION
Fig. 4a - WITH RADIAL MASK
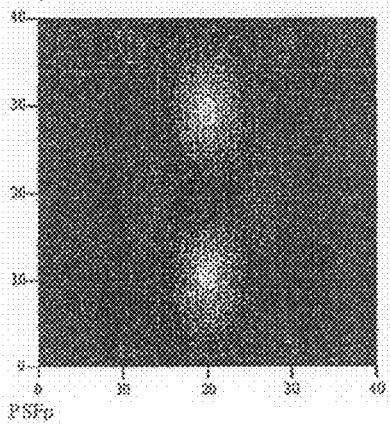
PSFp
Fig. 4b - WITH SPIRAL MASK
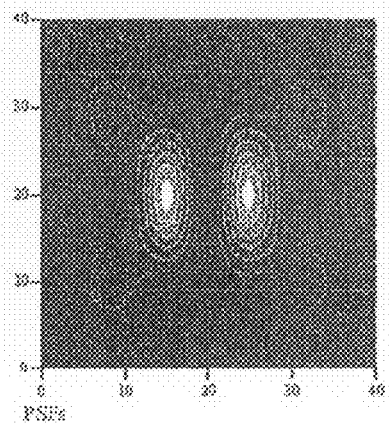
PSFa
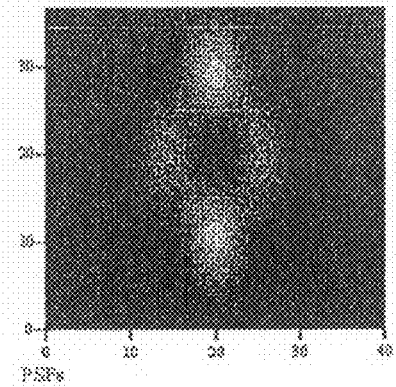
PSFs
Fig. 4c - INCOHERENT SUPERPOSITION OF 4a AND 4b IN THE OBJECT PLANE PR OF Fig. 1

Fig. 5 - REALIZATION 1 OF EXCITATION
Fig. 5a - WITH SPIRAL/RADIAL MASK
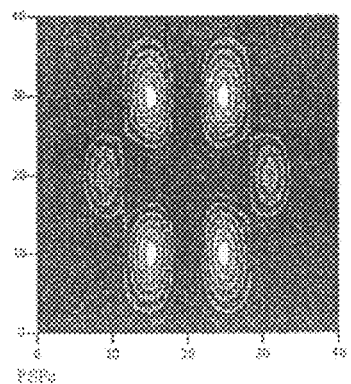
PSF
Fig. 5b - WITH SPIRAL MASK
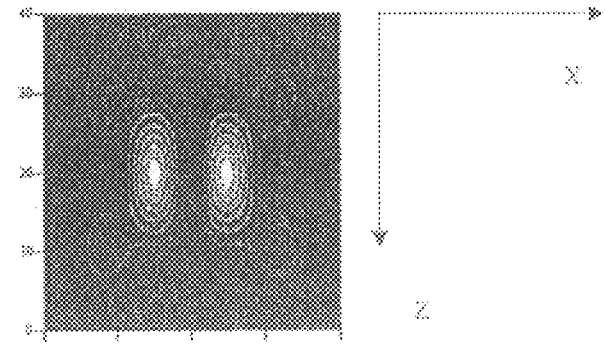
PSF
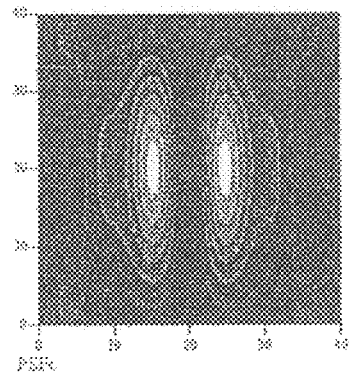
PSR
Fig. 5c - INCOHERENT SUPERPOSITION OF 5a AND 5b IN THE OBJECT PLANE PR OF Fig. 2

Fig. 6 - REALIZATION 1: EXCITATION
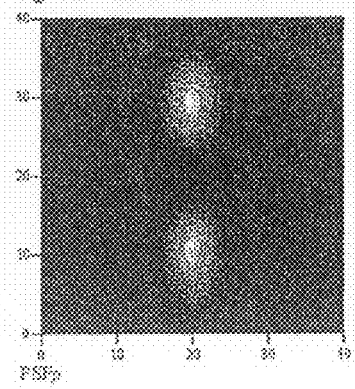
Fig. 6a - WITH RADIAL MASK
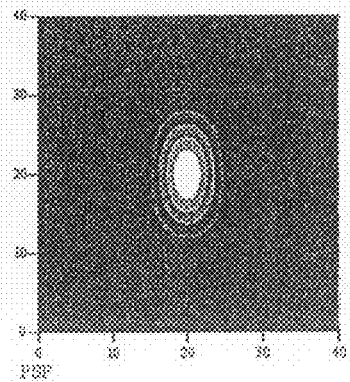
Fig. 6b - WITHOUT MASK
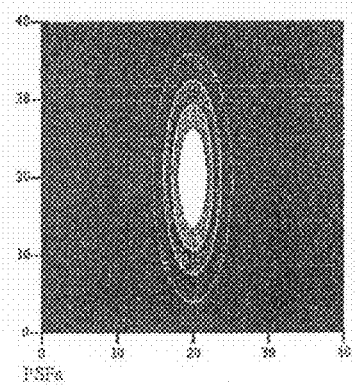
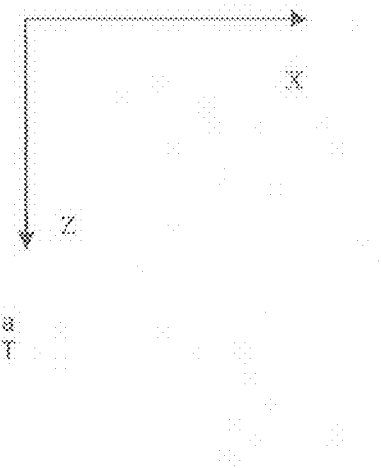
Fig. 6c - INCOHERENT SUPERPOSITION OF 6a AND 6b IN THE OBJECT PLANE PR OF Fig. 2

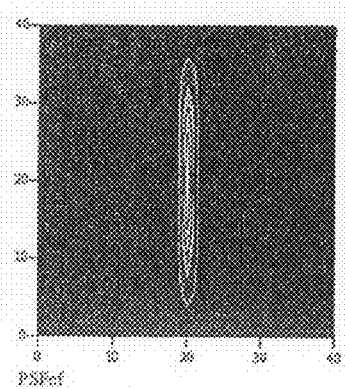
Fig. 7a
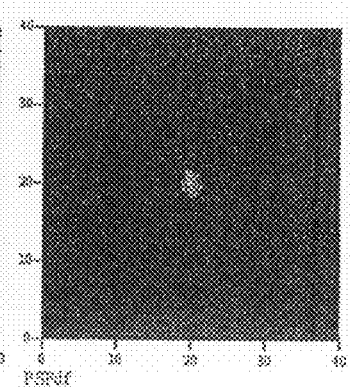
Fig. 7b
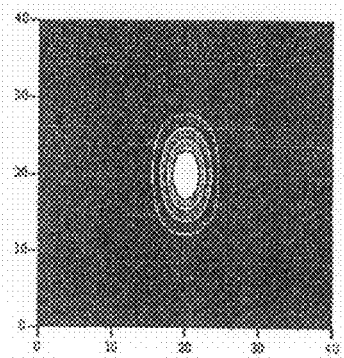
Fig. 7c
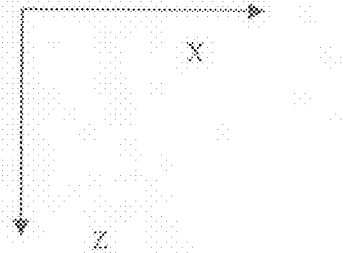
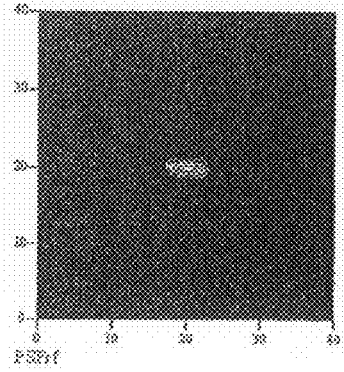
Fig. 8a
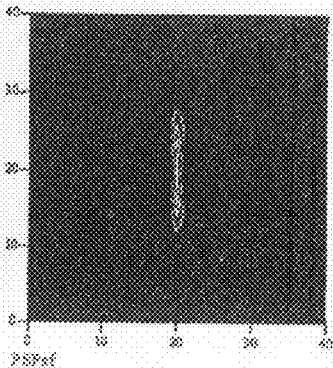
Fig. 8b

MICROSCOPE WITH HIGHER RESOLUTION AND METHOD FOR INCREASING SAME

BACKGROUND OF THE INVENTION

1. Field of the Invention

The present invention relates to microscopes with higher resolution with partial spatial superposition in the illumination by an excitation beam and a de-excitation beam and/or a switching beam in a fluorescing sample.

2. Description of Related Art

Methods for increasing the optical resolution in a far-field with diffraction-limited resolution, which methods are based on nonlinear interaction of light with a sample, are known. Among such methods are microscopy with Stimulated Emission Depletion (STED) as discussed in U.S. Pat. No. 5,731,588, Ground State Depletion (GSD) as discussed in Hell and Kroug, Appl. Phys. B 60 (1995), pages 495-497, and optical modification (switching) of fluorescent substances as discussed in U.S. Pat. No. 7,064,824 B2.

In both cases, a diffraction-limited distribution of optical light (de-excitation light) is so modified by the diffraction-limited excitation distribution through a nonlinear interaction that the emission of the light can take place only from a sub-region. This sub-region (effectively Point Spread Function: PSF) can thereby be limited in all three spatial directions or only in a lateral direction. Suitable limits of the PSFs are thereby:

1. 3D limitation on the excitation volume; and
2. Lateral limitation of the excitation volume with enlarged depth of focus.

Thus, the prior art, which is not so efficient from the viewpoint of the steepness of the gradient, involves the use of phase masks in the pupil of the de-excitation light with radial phase shift (See for example the article written by T. A. Klar, S. Jakobs, M. Dyba, A. Egner, and S. W. Hell, as published in Proceedings of National Academy of Sciences, U.S.A. 97, page 8206 (2000)) or of phase masks with quadrant-wise phase shift (In the article written by E. Engel et al. in Appl. Phys. B 77, pages 11-17 (2003)).

The use of the spiral masks in the STED microscopy was proposed in Török and P. R. T. Munro, Opt. Expr. 12 (2004), page 3605. However the use of a spiral mask, as described in the aforementioned article, generates neither an excitation distribution that is limited in all spatial directions, nor a distribution that exhibits enlarged depth of focus, as described in the following.

BRIEF SUMMARY OF THE INVENTION

The aim of the invention is to provide a method and microscope with which the corresponding distributions can be generated relatively easily and with greater efficiency (represented by the steepness of the gradients of the distributions). Compared to generation of the distributions through superposition of several point sources (U.S. Pat. No. 5,866,911 A1), the following solutions are clearly simpler. In addition to that, a more efficient 3D limitation is possible.

The present invention relates to a microscope with higher resolution with partial spatial superposition in the illumination by an excitation beam and a de-excitation beam and/or a switching beam in a fluorescent sample. In the microscope, the light from the sample is deflected. In the excitation beam and/or in the de-excitation and/or switching beam, at least one combination of devices exercising circular and radial influence on the spatial phase is provided.

The present invention also covers a microscopic method accomplishing higher resolution. Under the inventive method, a fluorescent sample is illuminated with an excitation beam and a de-excitation beam and/or a switching beam successively in time. The selected beams are spatially superposed in part, with the spatial phase of the excitation and/or de-excitation and/or switching beam being subjected to circular and radial influence at the same time.

BRIEF DESCRIPTION OF THE DRAWINGS

The invention is better understood by reading the following Detailed Description of the Preferred Embodiments with reference to the accompanying drawing figures, in which like reference numerals refer to like elements throughout, and in which:

FIG. 3 graphically illustrates a radial mask R, a spiral mask S and a combination of a radial mask and a spiral mask SR in accordance with the present invention.

FIGS. 4a through 4c graphically show the resulting distributions with de-excitation and the realization according to the first exemplary embodiment shown in FIG. 1.

FIGS. 5a through 5c graphically show the resulting distribution with the de-excitation according to FIG. 2.

FIGS. 6a through 6c show the distribution for the excitation in FIG. 2.

FIGS. 7a through 7c graphically show resulting distributions in the X-Z plane.

FIGS. 8a and 8b show the distribution obtained in the prior art under the same conditions, namely with a mask with radial phase shift (FIG. 8a) or with a spiral mask (FIG. 8b) in de-excitation beam path.

DETAILED DESCRIPTION OF THE PREFERRED EMBODIMENTS

Figure 1:
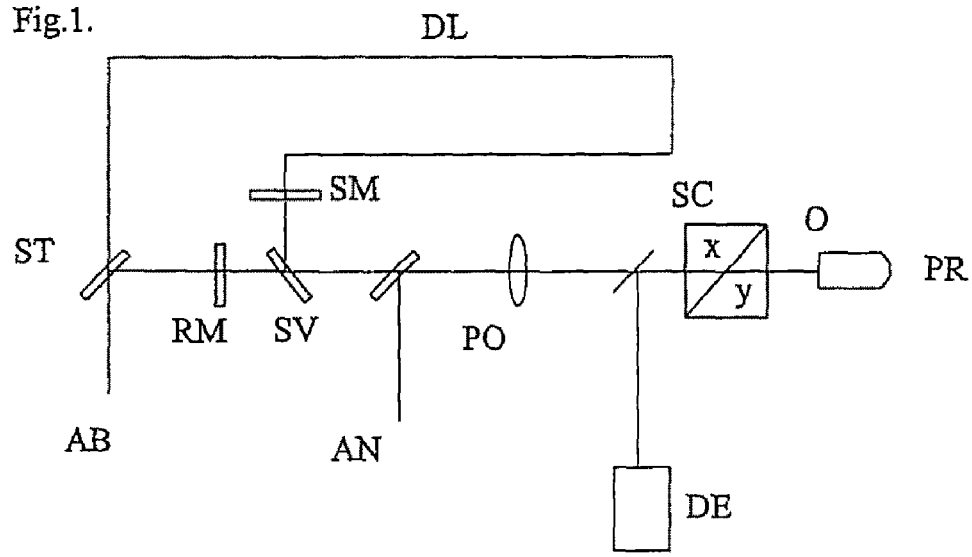
FIG. 1 shows a schematic diagram of a portion of a microscope embodying the present invention.

In describing preferred embodiments of the present invention illustrated in the drawings, specific terminology is employed for the sake of clarity. However, the invention is not intended to be limited to the specific terminology so selected, and it is to be understood that each specific element includes all technical equivalents that operate in a similar manner to accomplish a similar purpose.

Based on the present invention, it is possible to realize the following:

1. Excitation: Conventional PSF
   De-excitation: Incoherent superposition of a distribution with spiral phase in a pupil with the other distribution with one with radial phase in the pupil.
2. Excitation: Incoherent superposition of conventional PSF with one radial phase in the pupil.
   De-excitation: Incoherent superposition of a distribution with spiral phase in the pupil and one with spiral phase+radial phase.

FIG. 3 shows a radial mask (R), a spiral mask (S) and a combination of a radial mask and a spiral mask (SR), whereby the combination is possible as a successive arrangement of R and S or as a furnished gray scale design.

In this way, the phase values are shown with gray scale coding (white=0, black=2π):

$$R(r) = \exp(-j\pi) \text{ for } r < a/\sqrt{2}$$

$$S(\phi) = \exp(-j\phi)$$

$$SR(r,\phi) = R(r) + S(\phi)$$

with r: radial coordinate and φ: angular coordinate in the pupil (a: radius of the pupil).

In the following arrangements, the different excitation and de-excitation beams are shown separately, for example, with reference to STED using short pulses. In this case, the excitation takes place first and the de-excitation takes place thereafter, with time delay, by the stimulated emission as known in the prior art. The remaining excited molecules relax with emission of fluorescence, which is detected.

These arrangements can also be used in other methods for high resolution, such as (A) Ground State Depletion (GSD) (See: S. W. Hell and M. Kroug, Appl. Phys. B 60 (1995) page 495) or (B) switching of dyes (U.S. Pat. No. 7,064,824 B2). In (A), at first the dye is brought into the triplet state through repeated excitation, for which the de-excitation beam is used. The part of the dye remaining in the ground state is then excited by the excitation beam and fluorescence is detected. In (B) the molecules are switched by the de-excitation beam and are thus brought into a non-fluorescent state. Thereafter, the excitation of the molecule takes place with the excitation beam, whereby the molecules remaining in the fluorescent state can emit fluorescent light, which is detected. In both cases, the use of the pulsed light (as in STED) for the excitation and the de-excitation beam is not necessary.

Figure 2:
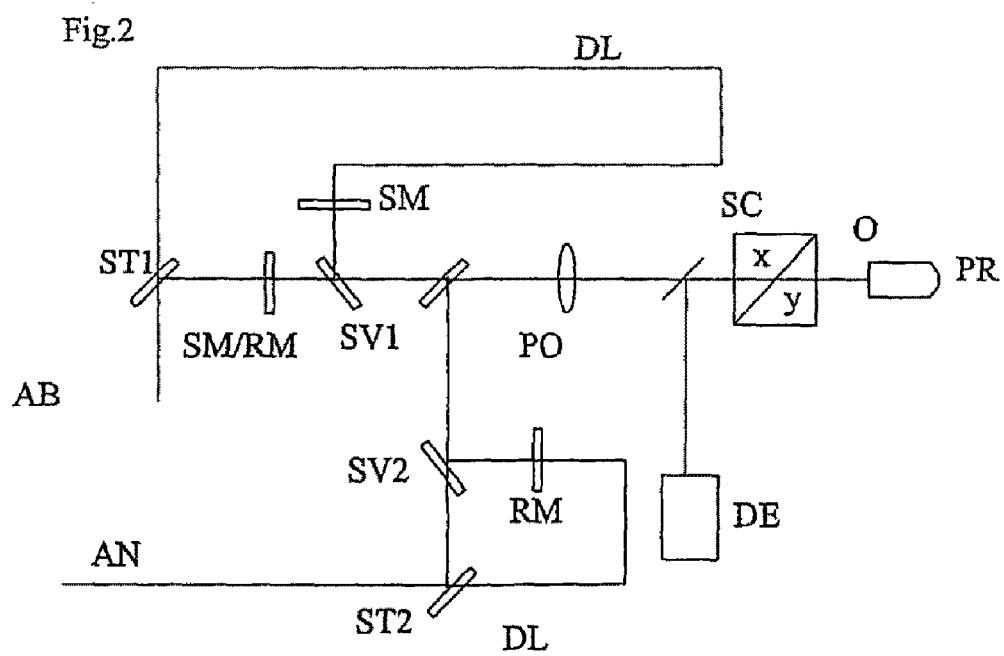
FIG. 2 shows a schematic diagram of a portion of a microscope embodying another version of the present invention.

Description of FIGS. 1 and 2 (reference symbols apply to both figures):

AN: Excitation beam path
AB: De-excitation beam path
DE Detector
SC: Scanner
O: Objective
ST: Beam splitter
SV: Beam combiner
PO: Pupil optics
DL: Delay for extending the path of the light
SM: Spiral mask
RM: Radial mask
PR: Sample In FIG. 1, the excitation AN takes place with a customary PSF, for instance, a point scanner, through the pupil optics PO, scanner SC and objective O upstream of and in the direction of sample PR. The de-excitation beam path AB is split into two beams by means of a beam splitter ST. One beam path with the delay DL (in which the extended length, achieved possibly by means of fiber optical waveguides, is greater than the coherence length of the used laser), comprises spiral mask SM, the other one comprises radial mask RM, whereby the delay ensures that there is incoherent superposition of the two partial beams behind beam combiner SV. The masks are imaged through the pupil optics PO at or in the vicinity of an objective pupil.

In FIG. 2, there is a similar de-excitation beam path AB as in FIG. 1, whereby radial mask RM is replaced in this case by the combination mask RM/SM. The excitation beam path AN is also split by means of a second beam splitter ST2 into two beam paths. In the path of the partial beam with delay DL, there is a radial mask RM, which is imaged at the objective pupil or in its vicinity. The delay DL ensures that there is incoherent superposition of the partial beams behind the second beam splitter SV2.

The delay must be greater than the coherence length of the source, which can be practically achieved in the case of highly coherent lasers only with fibers. Another possibility of incoherent superposition lies in the use of light with slightly different wavelengths (within the excitation spectrum for fluorescence (GSD) and/or for switching or of an emission spectrum (STED)). This is especially the preferable embodiment in the case of the CW lasers. Thus, for example, for the switching and the excitation of the protein Dronpa, radiations of 488 nm as well as of 477 nm are used. Thus, in the de-excitation beam path in the arrangement of FIG. 1, 488 nm radiation is generated by the spiral mask and 477 nm radiation by the radial mask and can be combined using suitable dichroic beam splitters. The same holds true for the excitation and the de-excitation beam paths in the arrangement of FIG. 2.

The image of the pupil must generate a stationary phase distribution in the pupil plane of the objective.

Regardless of the nature of the sample interaction, the excitation and the de-excitation beams arrive at the sample in general one after the other in the course of time. Either the sample is "prepared" with the de-excitation beam and subsequently the prepared state is "polled" by the excitation beam (GSD and switching), or the excitation is modified by a time-delayed de-excitation beam (STED).

With that in mind, incoherent superposition of the excitation and the detection beams is ensured.

Next, the cross sections along the lateral coordinates (horizontal) and the axial coordinates (vertical) are shown for each case, whereby the distributions exhibit rotational symmetry with respect to the axial (optical) axis.

FIGS. 4*a* through 4*c* show the resulting distributions with de-excitation and the realization according to the first exemplary embodiment shown in FIG. 1. One can see that a three-dimensional limitation appears in that region of the focus (object plane PR in FIG. 1) (in the middle of FIG. 4*c*), in which there is no de-excitation beam.

FIGS. 5*a* through 5*c* show the resulting distribution with the de-excitation according to FIG. 2. One can see that in the object plane PR (5*c*), a region, extending in the axial direction and limited laterally, appears, in which there is no de-excitation beam.

FIGS. 6*a* through 6*c* show the distribution for the excitation in FIG. 2. One can see that in FIG. 6*c*, an excitation beam distribution, extending longitudinally farther compared to the normal PSF, is generated in the object plane PR (FIG. 6*b*).

Simulation Results:

The PSFs (assumed normalized to 1 in equation (1)) used for the switching-off leads to reduction in the excitability (or the excitation) of the dye according to:

$$A(x, y, z) = \exp\{-\sigma D \cdot PSF_s(x, y, z)\} \quad (1)$$

where σ indicates the cross section of the switching (or of the de-excitation) and D indicates the irradiation energy per unit area. The total PSF obtained from the excitation with a $PSF_a$ is then:

$$PSF(x, y, z) = A(x, y, z) \cdot PSF_a(x, y, z) \quad (2)$$

Below that, the x-z sections through the PSF for the case of the switchable protein Dronpa are shown (lateral=horizontal, axial=vertical). Thereby, the switching-off with a cross section of 0.07 cm2/mW/s is assumed (See: S. Habuchi et al., Proc. Natl. Acad. Sci. U.S.A. 102, page 9511 (2005)).

For irradiation energy of 3 W/cm²/s (that is, for instance, 3 mW in 10 μs focused on 1 μs²), one obtains the distribution as in FIG. 7a for the realization 2 (with the de-excitation corresponding to FIG. 5c and the excitation corresponding to FIG. 6c), and, for the realization 1 (with the de-excitation corresponding to FIG. 4c and the excitation corresponding to FIG. 6b) one obtains the distribution as in FIG. 7b compared to that with conventional PSF (FIG. 7c)

For comparison, let the distribution obtained in the prior art under the same conditions, namely with a mask with radial phase shift (FIG. 8a) or with a spiral mask (FIG. 8b) in de-excitation beam path, be shown. One can clearly see that in case of FIG. 8a there is indeed an axial limitation of the PSF, but one obtains a lateral limitation that is not acceptable. Hence the resolution is improved only in the axial direction. In case of FIG. 8b, the same applies in regard to the exclusively lateral improvement of the resolution. In contrast to FIG. 7a, in this case there is no enlargement in the depth of focus that is of relevance in applications.

Modifications and variations of the above-described embodiments of the present invention are possible, as appreciated by those skilled in the art in light of the above teachings. It is therefore to be understood that, within the scope of the appended claims and their equivalents, the invention may be practiced otherwise than as specifically described.

The invention claimed is:

1. A microscope possessing higher resolution for measuring a fluorescent sample, the microscope comprising:
    excitation means for generating an excitation beam for illuminating a sample,
    de-excitation means for generating first and second de-excitation beams having a spatial phase,
    means for exercising circular and radial influence on the spatial phase of the first and second de-excitation beams,
    a beam combiner in the paths of the first and second de-excitation beams, and
    superposing means for incoherently superposing the first and second de-excitation beams downstream of the beam combiner.

2. The microscope of claim 1, wherein the microscope further comprises an objective lens upstream of the sample, and
    wherein the superposing means comprises pupil optics between the excitation means and the objective lens, and the means for exercising circular and radial influence lies in or in the vicinity of the pupil plane of the objective lens.

3. The microscope of claim 1, wherein the microscope further comprises means for scanning the sample with the excitation beam.

4. The microscope of claim 1, wherein the de-excitation means includes means for generating a single de-excitation beam and beam splitting means for splitting the single de-excitation beam into the first and second de-excitation beams, and
    wherein the microscope further comprises delay means in the beam path of the first de-excitation beam for delaying the first de-excitation beam, wherein the first and second de-excitation beams are incoherently superimposed due to the delay caused by the delay means.

5. The microscope of claim 4, wherein the means for exercising circular and radial influence includes a spiral mask in the path of the first de-excitation beam and a radial mask in the path of the second de-excitation beam.

6. The microscope of claim 4, wherein the means for exercising circular and radial influence includes a combination spiral-radial mask in the path of the first de-excitation beam and a radial mask in the path of the second de-excitation beam.

7. The microscope of claim 6, further comprising:
    further beam splitting means for splitting the excitation beam into the first and second excitation beams,
    further delay means in the beam path of the first excitation beam for delaying the first excitation beam
    a radial mask in the beam path of the first excitation beam,
    a further beam combiner in the paths of the first and second excitation beams, and and
    further beam superposing means for incoherently superposing the first and second excitation beams downstream of the further beam combiner, wherein the first and second excitation beams are incoherently superimposed due to the delay caused by the further delay means.

8. The microscope of claim 1, wherein the de-excitation means includes means for generating a single de-excitation beam and beam splitting means for splitting the single de-excitation beam into the first and second de-excitation beams, and
    wherein the means for exercising circular and radial influence includes a spiral mask in the path of the first de-excitation beam and a radial mask in the path of the second de-excitation beam, wherein the spiral and the radial masks cause the first and second de-excitation beams, respectively, to have slightly different wavelengths within the excitation spectrum for fluorescence, and wherein the combined first and second de-excitation beams are incoherently superimposed due to the difference in wavelengths.

* * * * *

UNITED STATES PATENT AND TRADEMARK OFFICE
CERTIFICATE OF CORRECTION

PATENT NO. : 7,709,809 B2  Page 1 of 1
APPLICATION NO. : 11/806459
DATED : May 4, 2010
INVENTOR(S) : Michael Kempe It is certified that error appears in the above-identified patent and that said Letters Patent is hereby corrected as shown below:

Title page, item [73] assignee, change "Microimaging"

to --MicroImaging--

Signed and Sealed this

Thirty-first Day of August, 2010

David J. Kappos
*Director of the United States Patent and Trademark Office*